US008693569B2

(12) United States Patent
Chen et al.

(10) Patent No.: US 8,693,569 B2
(45) Date of Patent: Apr. 8, 2014

(54) METHODS AND APPARATUS FOR DYNAMIC WIRELESS DEVICE COEXISTENCE

(75) Inventors: Camille Chen, Cupertino, CA (US);
Hassan Lashkari, Palo Alto, CA (US);
Sonal Tambe, Sunnyvale, CA (US);
Frederick Berkowitz, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 12/821,823

(22) Filed: Jun. 23, 2010

(65) Prior Publication Data

US 2011/0090982 A1    Apr. 21, 2011

Related U.S. Application Data

(60) Provisional application No. 61/252,938, filed on Oct. 19, 2009.

(51) Int. Cl.
*H04B 15/00* (2006.01)

(52) U.S. Cl.
USPC ........... 375/285; 375/147; 375/149; 375/219; 375/260; 375/262; 375/267; 375/343; 375/347

(58) Field of Classification Search
USPC ......... 375/285, 146, 147, 260, 267, 343, 347; 455/63.1, 41.2, 575.3, 552.1, 575.1; 370/297, 310
See application file for complete search history.

(56) References Cited

U.S. PATENT DOCUMENTS

| | | | |
|---|---|---|---|
| 8,284,721 B2 | 10/2012 | Chen et al. | |
| 8,379,548 B1* | 2/2013 | Husted | 370/297 |
| 2005/0215197 A1* | 9/2005 | Chen et al. | 455/41.2 |
| 2007/0224936 A1* | 9/2007 | Desai | 455/41.2 |
| 2008/0108394 A1* | 5/2008 | Davis et al. | 455/569.1 |
| 2008/0200124 A1* | 8/2008 | Capretta et al. | 455/41.3 |
| 2009/0176454 A1 | 7/2009 | Chen et al. | |
| 2009/0257379 A1 | 10/2009 | Robinson et al. | |
| 2010/0034381 A1* | 2/2010 | Trace et al. | 380/255 |
| 2010/0153395 A1* | 6/2010 | Hannuksela et al. | 707/737 |
| 2011/0081858 A1 | 4/2011 | Tolentino et al. | |

OTHER PUBLICATIONS

Bluetooth Core Specification v2.1 +EDR, dated Jul. 26, 2007.
Bluetooth Advanced Audio Distribution Profile 1.2 , dated Apr. 16, 2007.
Bluetooth Audio/Video Remote Control Profile 1.3, dated Apr. 16, 2007.
Bluetooth Basic Imaging Profile (BIP) , dated Jul. 25, 2003.
Bluetooth Basic Printing Profile (BPP) 1.2, dated Apr. 27, 2006.
Bluetooth Cordless Telephony Profile (CTP), dated Feb. 22, 2001.
Bluetooth Device Identification Profile (DI) 1.3, dated Jul. 26, 2007.

* cited by examiner

*Primary Examiner* — Dhaval Patel
(74) *Attorney, Agent, or Firm* — Gazdzinski & Associates, PC

(57) ABSTRACT

Methods and apparatus for dynamically compensating for the effects of interference between multiple wireless communications apparatus. In one embodiment, the method comprises providing a first wireless communication apparatus operating in a first band and a second wireless communication apparatus operating in the same first band (or proximate to the first band and with a comparatively high transmitter power), where the second wireless communication apparatus operates according to a different communication protocol than the first wireless communication apparatus and further change in physical configuration with respect to one another. Based on the physical configuration, interference is compensated for between the first wireless communication apparatus and the second wireless communication apparatus "on the fly" by selecting and operating according to one of a plurality of operational protocols.

39 Claims, 9 Drawing Sheets

| Angle(deg) | -30 | 0 | 30 | 60 | 90 | 120 | 150 | 180 | 210 |
|---|---|---|---|---|---|---|---|---|---|
| PER(%) | 32% | 92% | 89% | 92% | 84% | 76% | 80% | 52% | 89% |
| RSS(dBm) | -53 | -61 | -63 | -63 | -57 | -54 | -54 | -54 | -54 |

| Angle(deg) | -30 | 0 | 30 | 60 | 90 | 120 | 150 | 180 | 210 |
|---|---|---|---|---|---|---|---|---|---|
| PER(%) | 0% | 0% | 0% | 0% | 0% | 0% | 0% | 0% | 0% |
| RSS(dBm) | -53 | -61 | -63 | -63 | -57 | -54 | -54 | -54 | -54 |

METHODS AND APPARATUS FOR DYNAMIC WIRELESS DEVICE COEXISTENCE

PRIORITY

This application claims priority to co-pending U.S. Provisional Patent Application Ser. No. 61/252,938 filed Oct. 19, 2009 and entitled "Methods and Apparatus for Dynamic Wireless Device Coexistence", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to compensating for or mitigating the effects of electro-magnetic signal interference in devices implementing two or more wireless air interfaces or protocols.

2. Description of Related Technology

The effective implementation of convergence products has led to a revolution in the way consumers view computerized devices. These next generation computerized devices focus on offering consumers a substantially unified solution for a variety of services to which consumers have become accustomed. Examples of such a converged solution include the exemplary Macbook Air™ laptop computer, and iPhone™ smartphone, each manufactured by the Assignee hereof, and each which support a variety of wireless protocols and other functions. For instance, the aforementioned iPhone smartphone has the capability of, among other things, sending and receiving data over a WLAN network, making and receiving calls using a GSM cellular network, and operating wireless peripheral equipment (such as wireless headsets or Human Interface Devices (HIDs)) using the Bluetooth protocol.

As technologies converge, implementation requirements and constraints, including cost, size, and antenna isolation in these hardware systems inevitably introduce difficulties which can potentially result in a poor user experience with the device. For example, both Bluetooth and WLAN (802.11b/g/n) share the same ISM band in the 2.4-2.4835 GHz frequency range. Due to the close physical proximity of these wireless interfaces (including their antenna) in these converged or unified devices, the Bluetooth and WLAN technologies can interfere with each other when operating simultaneously, and can cause problems such as for example Bluetooth audio stutter and drop-outs, slow WLAN transfer speeds, poor Bluetooth mouse (MS) tracking, link dropouts, etc.

In devices where the physical configuration of the device can change, such as in the exemplary case of a clamshell-type laptop computer or smartphone, most 2.4 GHz WLAN and Bluetooth coexistence solutions focus exclusively on open-lid cases for these portable systems, as this is a common usage scenario (in that the display is presumed to be viewable by the user during use). However, this common usage scenario can no longer be taken for granted as other devices, such as external displays, continue to improve and become increasingly affordable opening up many new applications where the device is intended for operation in a "clamshell" mode (i.e., closed-lid) physical configuration. There is a reasonable user expectation for Bluetooth and WLAN performance in this mode to be on par with open-lid use.

Moreover, aside from traditional clamshell-type arrangements, yet other form factors for computers and portable devices such as smartphones are emerging. For instance, the outer/display cover on some smartphones slides laterally to expose the display and keypad on some models, or one portion of the housing may fit at least partly within the other.

In some cases, the foregoing devices utilize partly or completely metallic casings or housings, which can further exacerbate the effects of interference (partly in that the number of options for placement of the two or more antennas are significantly reduced over a non-metallic case due to inter alia, antenna isolation considerations).

There are a number of technical challenges in closed-lid/cover operation that can adversely affect wireless performance. Often, since design goals are set up to ensure acceptable open-lid performance, it is not uncommon for the clamshell operation of the device to be compromised. For example, WLAN and BT antenna efficiencies may decrease, antenna patterns can change, and WLAN/BT antenna isolation may be greatly reduced (and platform noise may increase) in closed-lid mode, as compared to an open-lid physical configuration. In terms of user-experience this can translate to slower data rates when web-surfing or uploading/downloading data, jerky BT mouse or touchpad tracking, and interrupted BT headset/headphone audio, among other effects of co-located air interface interference.

Accordingly, improved methods and apparatus for dynamically compensating for the effects of interference between wireless technologies that at least partly operate in the same frequency bands are needed, that recognize that performance characteristics can change (sometimes quite significantly) based on the physical configuration of the device. Ideally, such methods and apparatus would also ultimately provide the user with the best user experience possible, while offering converged services in a unified client device in a space- and power-efficient manner. In addition, such methods and apparatus would also ideally take into account the different ways the device is typically used in these different physical configurations.

SUMMARY OF THE INVENTION

The present invention satisfies the foregoing needs by providing, inter alia, methods and apparatus for dynamically compensating for the effects of interference in a wireless system or device with co-existing air interfaces that operate in multiple physical configurations.

In accordance with a first aspect of the invention, a method of mitigating the interference between multiple wireless communication apparatus is disclosed. In one embodiment, the multiple wireless communication apparatus (e.g., air interfaces) are disposed substantially within the same device, and the method includes: determining a physical configuration of two or more antenna-bearing components of the device; and operating the device according to a co-existence scheme based at least in part on the determined physical configuration.

In another variant, the two or more components do not each contain one or more of the air interfaces, but none-the-less affect the operation of the interfaces (such as via changes in antenna efficiency, directivity, changes in the position of one component affecting the interaction of the antennas in the other component with each other of the environment).

In accordance with a second aspect of the invention, portable computerized apparatus is disclosed that is adapted to permit substantially unimpeded operation of each of two or more different air interfaces in any physical configuration of the device.

In a third aspect of the invention, fixed or substantially non-portable computerized apparatus with variable component configuration which affects air interface operation, and which has been optimized according to the invention, is disclosed. For example, a substantially fixed server solution which has different options for wireless card type and/or placement within the device may have different noise floors associated with the different types/placements, and hence require different co-existence solutions.

In a fourth aspect of the invention, test apparatus and methods adapted to evaluate the isolation of one or more antenna systems are disclosed.

In a fifth aspect of the invention, a computer readable apparatus comprising a storage medium with at least one computer program stored thereon is disclosed. In one embodiment, the computer program, when executed, implements a dynamic interference mitigation protocol based on, inter alia, the position or physical configuration of one or more components of the host device on which it is running.

In a sixth aspect of the invention, a method of doing business is disclosed. In one embodiment, the method includes configuring and selling electronic devices (e.g., laptops, smartphones, personal media players, etc.) which include the ability to dynamically mitigate interference based on device configuration for consideration.

Other features and advantages of the present invention will immediately be recognized by persons of ordinary skill in the art with reference to the attached drawings and detailed description of exemplary embodiments as given below.

DETAILED DESCRIPTION OF THE INVENTION

Overview

Figure 1:
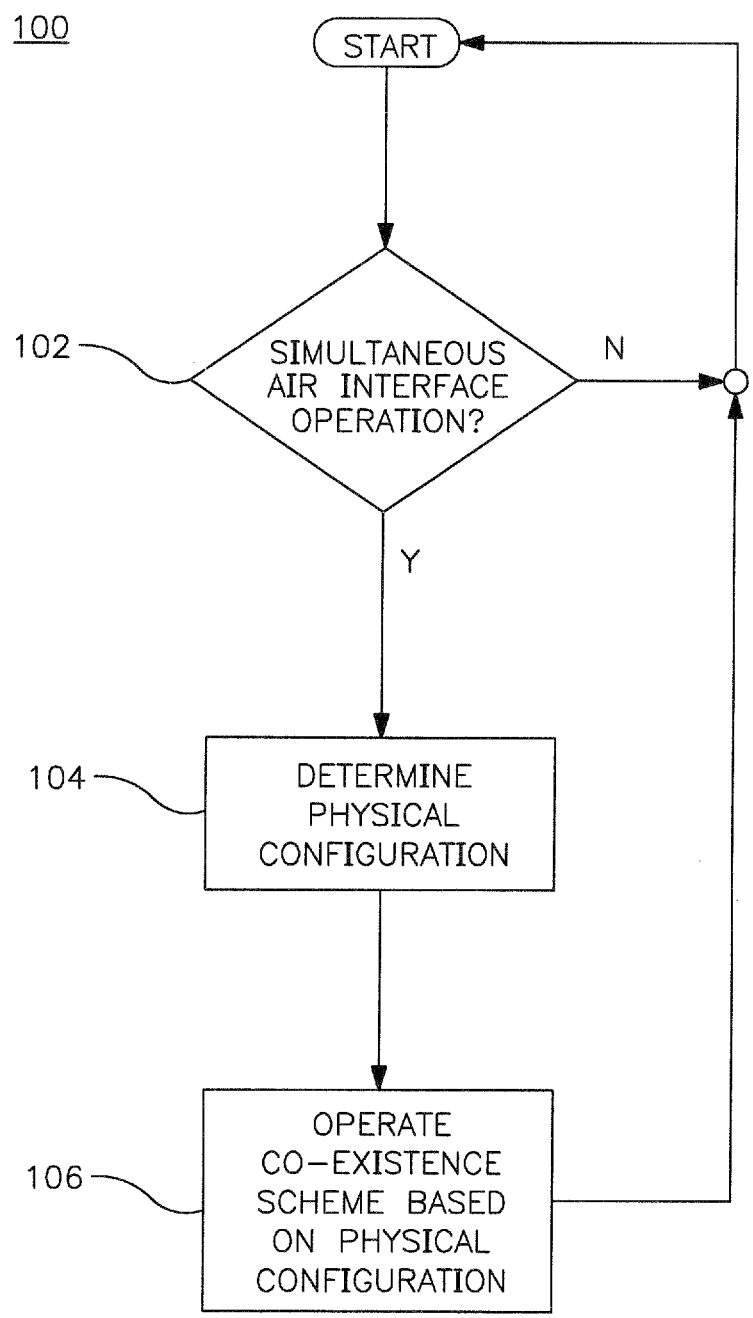
FIG. 1 is a logical flow diagram illustrating an exemplary embodiment of the generalized method for compensating for the effects of interference in accordance with the principles of the present invention.

The present invention provides, inter alia, methods and apparatus for mitigating the effects of electro-magnetic interference (EMI) between co-located or proximate wireless devices (e.g., air interfaces) in a client or user device such as a mobile computer or smartphone. In one exemplary embodiment, the methods and apparatus are used to dynamically mitigate the interference between co-located WLAN (e.g., Wi-Fi) and PAN (e.g., Bluetooth) air interfaces disposed within a physically constrained (e.g., small form factor) device under various component configuration (and antenna isolation) scenarios. For example, such different configuration scenarios might relate to the top and bottom portions of a "clamshell" type housing being at certain positions relative to one another, the cover of a slide-type enclosure being open or closed, an first component which is articulated in multiple dimensions with respect to another, and the like.

Depending on the relationship of the aforementioned components, one or more co-existence schemes are selectively implemented (or removed from service), so as to optimize "user experience" in one or more aspects. For instance, in the case of BT peripherals, such optimization might comprise maintaining the packet error rate (PER) below a certain prescribed level, thereby avoiding any perceptible jerkiness or discontinuity in the operation of a BT mouse, or "machine-gunning" of keys on a wireless keyboard. Such considerations can also be multi-variate; e.g., optimizing BT mouse or keyboard performance as above while also optimizing WLAN data throughput.

DETAILED DESCRIPTION OF EXEMPLARY EMBODIMENTS

Exemplary embodiments of the present invention are now described in detail. While these embodiments are primarily discussed in the context of Bluetooth and WLAN air interface coexistence, it will be recognized by those of ordinary skill that the present invention is not limited to any particular wireless protocols. In fact, the principles discussed herein are equally applicable to any number of wireless protocols which at least partly share frequency bands, and with which antenna isolation problems occur as a result of the two wireless protocol implementations being substantially co-located. As used herein, the term "co-located" refers to two or more devices or components which are sufficiently physically proximate one another so as to cause at least some level of interference with the operation of at least one of the devices/ components. Such proximity may occur in cases where the devices are within the same host device or form factor, or alternatively when they are physically separate from one another (i.e., not in the same host), but placed proximate one another.

Furthermore, as used herein, the term "wireless" means any wireless signal, data, communication, or other interface including without limitation Wi-Fi, Bluetooth, 3G, LTE, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Moreover, while discussed primarily in the context of a basic two-protocol topology, it is recognized that other topologies (e.g., three-protocol, etc.) may be used consistent with the invention. For instance, WLAN, Bluetooth, and wireless USB could conceivably be used simultaneously and could benefit from the coexistence solutions discussed subsequently herein. Such a system or device might integrate WLAN, Bluetooth and wireless USB, WLAN for network, Bluetooth for PAN, including FTP, headphone/headset, and wireless USB for remote controller, HID (mouse (MS), keyboard (KB) and touchpad).

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (labeled "A", "B" and "C" for purposes of this discussion), yet the most common operating mode for the user device is where only two of the three interfaces are operated simultaneously. Depending on which of the three interfaces are being operated at a given time, the policies or rules applied may be different. For example, interface A might have significant mutual interference issues with interface B, but not with interface C. Similarly, interface C might have significant issues with interface B, but not A. So, the present invention explicitly contemplates the dynamic selection and application of one or more operating policies or configurations based on a determination of which interfaces are operating at a given time.

Methods—

Referring now to FIG. 1, one exemplary embodiment of the generalized method of dynamically adjusting to physical configuration changes and compensating for the effects of interference between multiple air interfaces is disclosed. As shown in FIG. 1, the first step 102 of the method 100 comprises determining whether or not multiple air interfaces are operating simultaneously; i.e. whether there is a potential interference problem between multiple ones of air interfaces. For example, in one embodiment, the device determines whether both a BT network interface and a WLAN interface are currently operating at the same time. It is appreciated that in the present context, the term "operating at the same time" can include situations where the air interfaces are operating generally at the same time; e.g., each may transmit/receive at different times which substantially overlap with transmission/reception of other air interface(s), yet each does not have to be transmitting or receiving (or "listening") at precisely the same time to create interference.

If the multiple interfaces are not operating at the same time per step 102, then co-existence interference will be known to not be a problem, and the system will continue to operate normally. Conversely, if the device determines that both the BT network interface and the WLAN interface are operating at the same time, then the methodology of FIG. 1 advances to step 104 to determine the physical configuration of the device.

In an alternative embodiment of the method 100, the device will utilize knowledge about future system operation in order to evaluate whether simultaneous operation of multiple air interfaces will occur at some future time. For example, the exemplary Time Capsule™ product manufactured by the Assignee hereof includes a software storage application that is known to have a backup operation schedule at a future time, where files will be uploaded to a remote Wi-Fi capable storage device (e.g., such as their separate Apple Time Capsule™ hardware). The device then uses the current operating knowledge about the system, such as the fact that a user is currently using a BT peripheral, to determine whether a simultaneous air interface conflict will likely occur in the future.

As yet another implementation example, the device will determine whether simultaneous air interface operation will occur due to scheduling of future air interface usage on two or more air interfaces in the future.

In addition to knowledge about the likelihood that air interfaces are currently or will in the future operate simultaneously, the system will also, in an exemplary embodiment, utilize knowledge about the applications that are making use of the respective air interfaces in order to further understand the likelihood that co-located interference will or will not be a problem. For instance, it may be that certain types of data transmission or reception applications are substantially robust or resistant to interference, and/or do not in any way significantly impact "user experience" (e.g., they are highly "bursty", have robust error correction algorithms, and/or no QoS requirements such that latency/retransmission protocols are not a substantial impediment to the user. Moreover, it is appreciated that knowledge of various combinations of applications may be pre-identified as "problematic" or "not problematic", and hence the logic/mitigation techniques applied may vary based on what combination of use cases or applications is present. Such knowledge can be e.g., implemented in the form of software or firmware algorithms running on the apparatus (e.g., CPU or other device processor) if not otherwise already addressed (such as by way of existing prioritization of voice and video over data transmission, packet priority tags, etc.), as described in greater detail below.

At step 104 of the method 100, the device determines the physical configuration that it is in currently. In an exemplary embodiment where the device comprises a laptop computer that operates in both: (1) an open-lid mode; and (2) a "clamshell" mode (i.e. closed or at least substantially closed), the device determines which mode it is currently operating in on a binary, or two-state, basis. Based on the current physical configuration of the device, the electrical characteristics which could affect air interface co-existence will be known to be different. This performance difference is caused by, among other things, isolation differences between the two or more competing air interfaces, which may be disposed in opposing sides or portions of the laptop housing. Table 1 below provides anecdotal data obtained by the inventors hereof that shows the behavior of one such exemplary implementation, and illustrates the isolation differences between a WLAN and a BT interface as a function of lid angular position. As can be seen from Table 1, antenna isolation tends to degrade significantly once the device is operating in a clamshell physical configuration.

TABLE 1

WLAN and Bluetooth Antenna Isolation as a function of Lid Angle

| Lid Angle | WLAN-BT Antenna Isolation (dB) | | |
|---|---|---|---|
| | 2.402 (GHz) | 2.45 (GHz) | 2.48 (GHz) |
| 110° | X1 + 9 | X2 + 11 | X3 + 8 |
| 90° | X1 + 9 | X2 + 8 | X3 + 8 |
| 60° | X1 + 8 | X2 + 8 | X3 + 7 |
| 30° | X1 + 2 | X2 + 4 | X3 + 6 |
| Clamshell (0°) | X1 | X2 | X3 |

With regards to return loss characteristics of the above exemplary implementation, Table 2 illustrates that the radio antennas may have different performance characteristics depending on the angle between the lid and the base. In the results illustrated below in Table 2, the open lid case at one hundred ten degrees (110°) has about 2 dB better BT antenna return loss performance than the closed/clamshell mode usage case. As can be seen, the improvement in return loss performance occurs rapidly after the device is opened (i.e., as angle increases), even at relatively small angles, over operation in the clamshell mode. Note that in general, the smaller the return loss, the better the system performs.

TABLE 2

Bluetooth Antenna Return Loss S11 (dB) as a function of Lid Angle

| Lid Angle | Bluetooth Antenna return loss S11 (−dB) | | |
|---|---|---|---|
| | 2.402 (GHz) | 2.45 (GHz) | 2.48 (GHz) |
| 110° | Y1 − 2 | Y2 − 2.2 | Y3 − 3.2 |
| 90° | Y1 − 1 | Y2 − 2 | Y3 − 2.5 |
| 60° | Y1 − 1 | Y2 − 1.7 | Y3 − 2 |
| 30° | Y1 − 1 | Y2 − 1 | Y3 − 1 |
| Clamshell (0°) | Y1 | Y2 | Y3 |

The ability for the device to determine the physical configuration it is currently operating in can be accomplished according to any number of acceptable means. For example, in one exemplary embodiment, a laptop computer comprises sensor hardware (e.g., an electromagnetic or proximity sensor, mechanical switch, etc.) that can physically determine whether the laptop itself is operating in an open-lid mode, or in a clamshell mode. The hardware will then store a value in memory indicative of the physical configuration of the laptop. In the open-lid mode, the laptop will store in an application program interface (API) registry a binary parameter value (e.g. 'kAppleClamshellStateKey'=0) that is indicative of the physical configuration of the device. Accordingly, the co-existence application software will read this registry value and have knowledge that the laptop is operating in an open lid mode. Conversely, if the laptop is operating in a clamshell mode, the laptop will store in its API registry a binary parameter value (e.g. 'kAppleClamshellStateKey'=1) that is indicative of the laptop operating in this particular physical configuration.

As an alternative to the binary (i.e. two-state) scheme described above, the physical configuration can be determined with increasing levels of granularity by determining the physical configuration of the lid at varying opening angles of the lid (e.g. between 0 and 180 degrees, 0 to 100% slid open {for sliding configurations}, etc.). In one embodiment, this increased granularity of lid angle is represented by adding additional bits to the parameter 'kAppleClamshellStateKey'. For example, with a two-bit value for the above-mentioned parameter, four (4) states can now be represented; or more generically with n bits, $2^n$ states can be represented for varying lid angles.

Furthermore, the representation of the physical configuration of the device further need not be represented in a digital form, such as the bit representation stored in an API registry as described above. Rather, a positioning sensor can be placed in the device which outputs the position of the lid in an analog form (e.g. as a varying output voltage, resistance, capacitance, etc.). This analog output can then be utilized as knowledge of the physical configuration of the device.

It is appreciated that in addition or in place of direct sensing of position, more passive approaches to configuration determination may be employed. For instance, it may be known that only certain other functions of the device operate in the two modes (i.e., clamshell and open-lid), such as where a light or LED is not energized until the lid is opened, or a processor/peripheral sleep mode is not exited until the lid is opened. Similarly, it may be with some devices that a peripheral cable or interface cannot be utilized until the lid is opened. Myriad different possible operational and functional permutations will be recognized by those of ordinary skill given the present disclosure.

Hence, by monitoring the status of these other extant "state indicators", the configuration of the device housing can be passively determined, thereby obviating the cost/need for a dedicated sensor arrangement. Moreover, it may be that only a subset of the available operating features or modes of one or more of the interfering air interfaces are available in certain housing configurations, thereby affording another mechanism by which the interference mitigation apparatus of the present invention can passively determine configuration (i.e., "if the WLAN or BT air interface is operating in A mode, that means conclusively that the housing is in configuration B").

As yet another option, sensing of the effects of interference can be used as another form of "passive" detection. For instance, consider the case where (assuming a fixed or known transmit power) the RSSI sensed by the receiver of one interface from a transmission of another interface varies as a function of housing configuration in a known way, thereby forming the basis of a "template". Hence, if the first interface is transmitting at a known power, etc. (i.e., conditions which generally correlate to those prevailing when the "template" response was obtained), and the second interface is receiving, a given actual (i.e., in situ) RSSI reading of "X" might correlate to a known closed-lid state, whereas a reading of "Y" might correlate to a known open-lid state).

At step 106, the device executes a co-existence scheme based at least in part on the determination of the physical configuration made at step 104. In an exemplary device implementation, the isolation between air interface antennas is worse in a closed configuration (i.e. clamshell) than in an open-lid device configuration. This is perhaps best understood in the fact that many prior art implementations of devices, such as laptops, were expected to be primarily used in an open device physical configuration by a typical user (since under such prior art paradigms, the display and keyboard was not accessible until the lid was opened). Accordingly, these laptop devices were designed such that the antenna isolation was optimized for use in these open physical configurations. However, with the increased usage of laptop devices in a clamshell configuration (as described previously and subsequently herein, such as for operations which do not require access to the aforementioned display/keyboard, or where one or both are disposed such that the lid need not be opened), this design assumption can no longer be taken for granted. Accordingly, in this exemplary device implementation, additional co-existence measures need to be utilized in order to ensure adequate user experience is experienced by a user, even in clamshell (closed) configurations.

While primarily envisioned as addressing this typical prior art design assumption, it is appreciated that methodology described herein applies more broadly than the specific device implementations described herein. That is, it is appreciated that performance characteristics (e.g. antenna isolation) experienced between air interfaces in a device where the physical shape of the device can be expected to change (such as the exemplary laptop device configuration described) differ according to the physical configuration of the device, encompass more than just "open-lid" and "clamshell" physical configurations. For instance, as previously noted, sliding-lid or cover devices have recently emerged which can benefit from various aspects of the present invention. Similarly, folder or "fold-out" configurations (e.g., where a tri-fold arrangement is used) may also benefit from the inventions, as may yet other configurations. As another possible application, spatially compact devices with articulated or rotatable displays may employ the invention, such as where the computer CPU, etc. is embodied in a base portion, and the display is articulated in multiple dimensions (e.g., tilt back, rotate left or right, skew, etc.) with respect to the base, and the two components each carry one or more air interface antennas. Hence, it will also be apparent that the present invention explicitly contemplates more complex spatial relationships than just "hinged" or "sliding", and in fact the principles of the invention may be extended to other coordinate systems beyond just polar (hinged) and linear/Cartesian (sliding), for example to spherical coordinate systems wherein the performance of one or more of the air interfaces may be affected based on various positions, angles, and/or displacements.

In an exemplary embodiment of the invention, these differing performance characteristics are predictable. That is, the performance characteristics can be understood with knowledge about the physical configuration of the device. Accordingly, the co-existence scheme executed can be executed purely taking into consideration the physical configuration of the device. The establishment of such a system is described further herein below with respect to FIG. 8.

Alternatively, the physical configuration of the device can be utilized solely to understand that the performance characteristics between the air interfaces are expected to change, without knowledge of the actual performance characteristics being experienced by the device. The knowledge with regards to the change in physical configuration can then be used as a trigger to measure the performance characteristics, such as by using the methods and apparatus described in co-owned and co-pending U.S. patent application Ser. No. 12/573,755 entitled "Methods and Apparatus for Enhanced Coexistence Algorithms In Wireless Systems" filed Oct. 5, 2009, which is incorporated by reference herein in its entirety. For instance, this knowledge can be utilized to select or adjust the co-existence scheme being implemented to account for this difference in physical configuration. The establishment of such a system is described further herein below with respect to FIG. 9. The generalized methodology of FIG. 1 is now described with respect to specific implementation examples as set forth below, and it will be appreciated that these examples are only for purposes of illustration, and in no way considered limiting of the broader principles of the invention.

EXAMPLE #1

Figure 2:
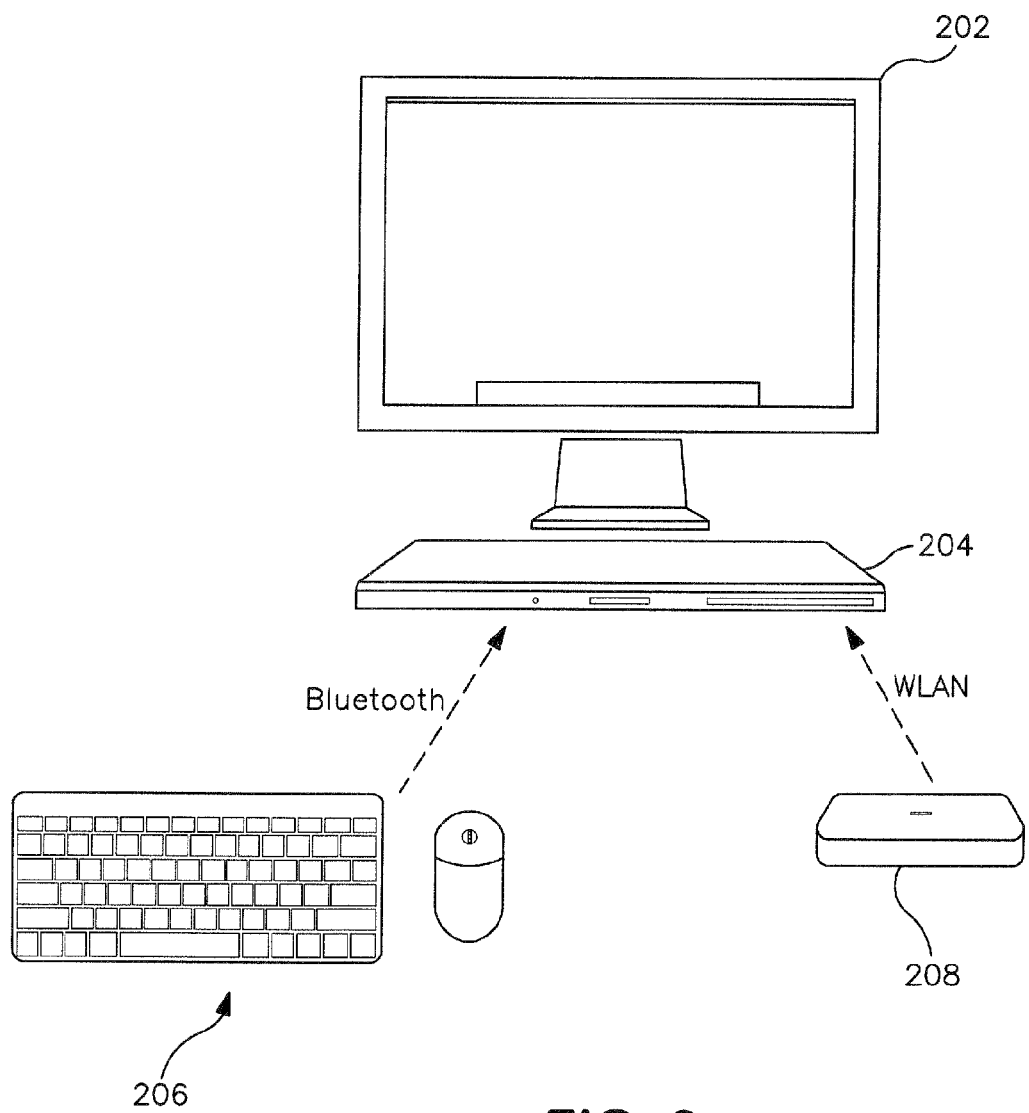
FIG. 2 is a graphical illustration of an exemplary WLAN/Bluetooth coexistence system (shown in clamshell mode) utilizing interference mitigation according to the invention.

Referring now to FIG. 2, an exemplary usage case is illustrated where a user connects an external display 202 to a portable laptop computer 204 operating in its clamshell mode while simultaneously being paired with one or more Bluetooth peripheral devices 206 (e.g., a Bluetooth keyboard and mouse), while also backing up data to a data storage device 208 (e.g., Time Capsule™) via a WLAN connection. The computer 204 includes a WLAN/BT combination wireless module that implements a hardware coexistence scheme on board the computer as described above. In the illustrated embodiment, the hardware coexistence allows for time-sharing between the two radios (i.e., WLAN and Bluetooth) when the antenna isolation between the air interfaces is not sufficient to provide adequate user experience when operating simultaneously.

The WLAN driver first checks the physical configuration of the device to determine whether the portable device is in an open-lid or clamshell physical configuration. Table 3 illustrates how this is accomplished in one embodiment, by demonstrating that the WLAN driver checks the API registry in order to determine if the portable device is in the open-lid mode or alternatively is operating in clamshell mode. If in the clamshell mode with poor antenna isolation (whether assumed or determined), the WLAN driver will turn on coexistence-mode operation. Generally, poor isolation is considered less than about 40 dB of isolation in the present context. Subsequently, if the user opens the laptop lid, and the antenna isolation between the air interfaces becomes reasonable (again, either assumed or determined), then the coexistence scheme can automatically be turned off via the driver if desired.

TABLE 3

Open Lid vs. Clamshell Mode Coexistence Setting

| Setting | Open Lid | Clamshell mode |
|---|---|---|
| Registry (API) | kAppleClamshell StateKey = 0 | kAppleClamshell StateKey = 1 |
| Coexistence command | btc_mode = off if isolation is "good" | btc_mode = on if isolation is "poor" |

Referring now to Table 4 below, one implementation of the dynamic operation of the coexistence scheme utilized in the portable device 204 of the illustrated embodiment is summarized by illustrating that coexistence is turned on or off automatically based on the isolation of the system. The antenna isolation measurement can be measured by non-intrusive means, specifically, by placing the WLAN in a constant Tx mode and simultaneously placing the BT radio in a receive mode. Based on the noise the BT radio is receiving, the antenna isolation can be estimated. Specifically, in an open-lid mode, the coexistence scheme is turned off as the system assumes sufficient isolation between the air interfaces. Alternatively, in closed-lid (i.e. clamshell mode), coexistence is turned on automatically as the system assumes a reduced level of antenna isolation.

TABLE 4

Dynamic WLAN/BT coexistence based on isolation

| Isolation Status | Coexistence scheme |
|---|---|
| Open/close - good | Off for both |
| Open/close - bad | On for both |
| Open/close one good, one bad | Dynamic turn on/off |

Tables 5 and 6 illustrate the priority table and the BT duty cycle, respectively, for each time-sharing profile of the portable device (where implemented). In other words, the time sharing algorithms utilized by the device 204 in one embodiment thereof will be determined at least in part based on the exemplary priority table and BT duty cycle as illustrated below.

TABLE 5

Bluetooth High Priority Packets and Duty Cycle

| Priority 1 | WLAN and BT management frames | Beacon, power saving, ... scan, sniff, inquiry, ... |
|---|---|---|
| Priority 2 | BT HIDs, SCO (HV3) | HV1/HV2 occupies too much time, will not support it |
| Priority 3 | WLAN data packets | Not a fixed priority; can be downgraded if BT packets have been denied too long |
| Priority 4 | BT data packets | Not a fixed priority; can be upgraded if it has been denied too long |

TABLE 6

Duty Cycle for various BT devices (High Priority packets)

|   | Products | BT slots | Duty Cycle (%) |
|---|---|---|---|
| 1 | SCO (HV3) | 6/18 | 33% |
| 2 | BT MS, KB | 2/18 | 11% each |
| 3 | BT HIDs | 2/18, 4/18 | 11%, 22% |
| 4 | Add'l sniff | 2/18 | 11% |

It will be appreciated that the priority structure reflected in Table 5 above may be varied as desired by the particular device implementation (or even the then-prevailing application in use). Moreover, it is noted that any of the priorities set forth in Table 5 can be made contingent or dependent upon other factors or conditions, and hence may be "variable" in nature (as indicated for Priorities 3 and 4 in Table 5).

Figure 3:
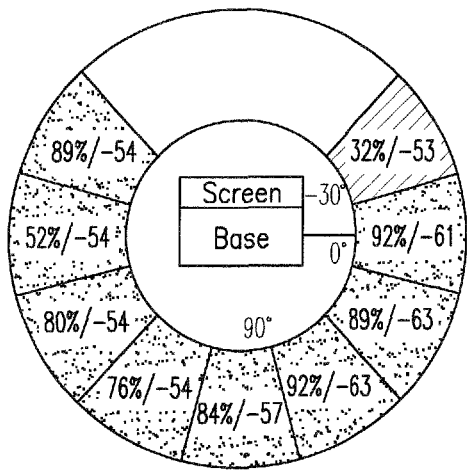
FIG. 3 is a tabular and graphical illustration of the packet error rate (PER) observed for a typical Bluetooth mouse in the system of FIG. 2, as a function of position and WLAN transmission rate, with the coexistence compensation scheme not present or turned off (the portable device operating in a closed or clamshell physical configuration).

By utilizing the ability to auto-detect open-lid and clamshell modes and operating the coexistence scheme dynamically, the user experience can be optimized based on the specific usage scenario in place. For example, while operating in the clamshell mode (which further limits the isolation between the air interfaces in the above example), the WLAN is being used to synchronize with a remote storage device. If the user is simultaneously using a BT mouse, the user may experience sluggish BT mouse tracking, or even possible link drops. FIG. 3 illustrates that if coexistence does not turn on in the clamshell mode for the above system, the BT mouse (MS) performance will suffer when the WLAN is in constant Tx at 2.4 GHz, as would be the case where a backup operation is being performed over the WLAN with a remote storage device as described above. The tabular chart of FIG. 3 illustrates the packet error rate (PER, in percent) and received signal strength indication (RSSI, in -dBm) as a function of physical configuration, while the pie chart of FIG. 3 illustrates the performance of the system as the BT mouse is circled around the portable device. It should be noted that based on anecdotal measurements made by the inventors hereof, a PER of less than ten percent (10%) will generally not be noticeable to a user, while a PER of greater than ten percent (10%) will result in sluggish performance by the mouse, and even the dropping of the BT link between the mouse and the portable device in more extreme cases.

Figure 4:
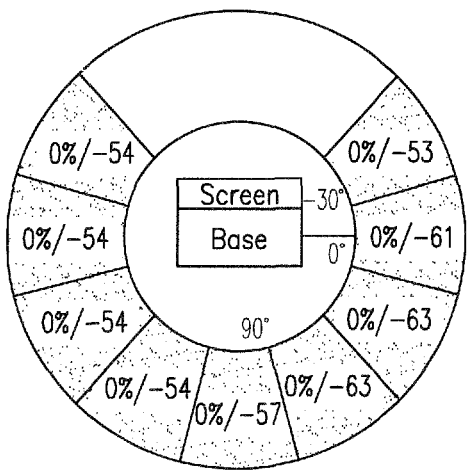
FIG. 4 is a tabular and graphical illustration of the packet error rate (PER) observed for a typical Bluetooth mouse as a function of position and WLAN transmission rate with the coexistence compensation scheme of the invention enabled or turned on (the portable device again operating in a closed or clamshell physical configuration).

Referring to FIG. 4, it is noted that with the coexistence scheme turned on, the BT mouse will operate in a way that provides a much improved experience for the user, as the packets sent from the BT mouse will have a higher priority than the WLAN data traffic (see Table 5 above). In fact, if the BT mouse is treated as high priority (while the WLAN and BT are implementing time sharing), the BT mouse will be protected from interference, and the PER will for all intents and purposes be non-existent. The drawback of such a coexistence scheme is that the WLAN performance will suffer directly as a function of the BT mouse's duty cycle. For instance, if a BT mouse is operating with an eleven percent (11%) duty cycle, the coexistence scheme may cause as much as a ten to twenty percent (10% to 20%) performance drop for the WLAN air interface. This is illustrated below with respect to FIG. 5.

Figure 5:
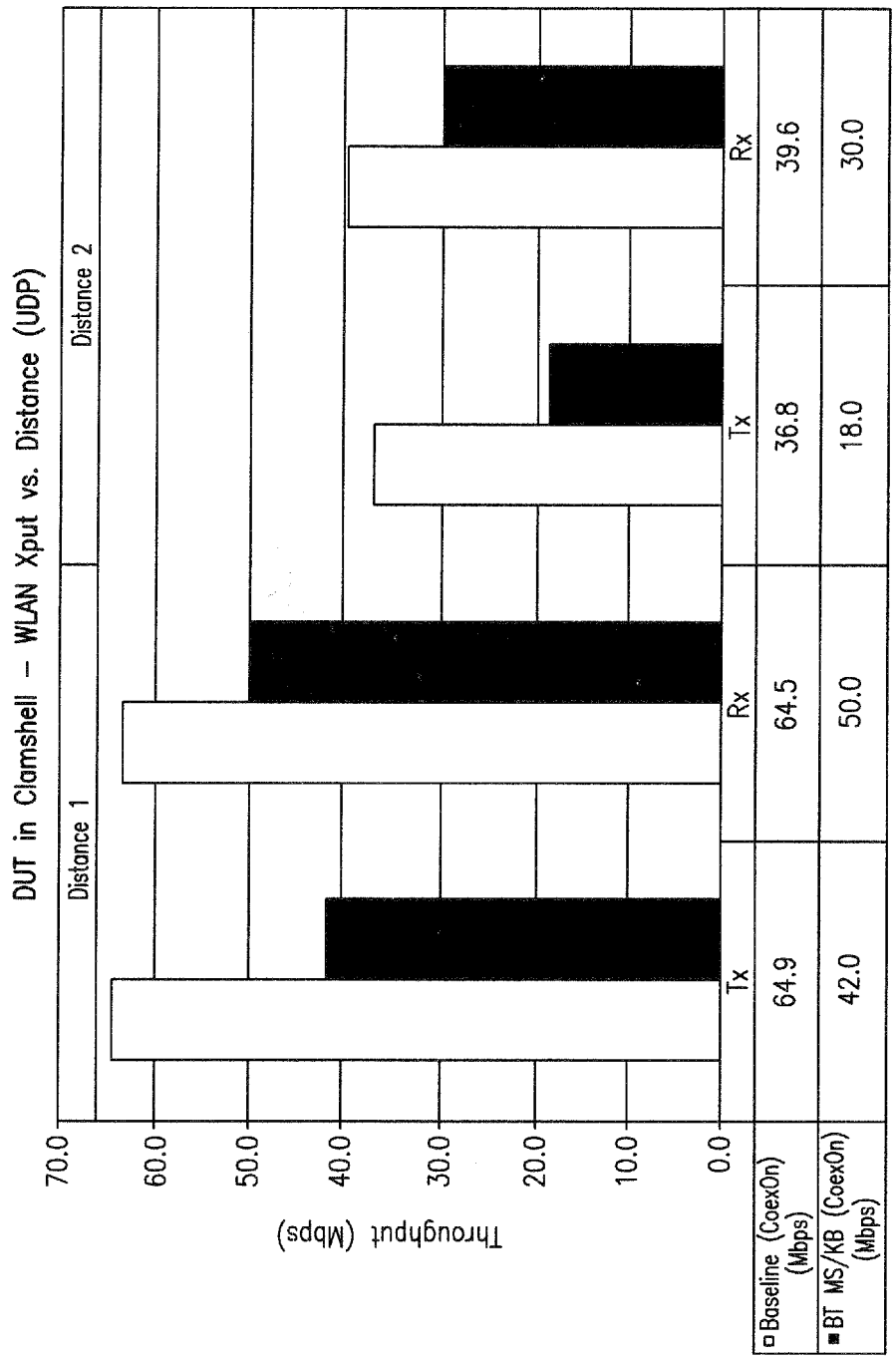
FIG. 5 is a graphical illustration of WLAN performance as a function of different coexistence operation modes (in a clamshell physical configuration), according to the invention.

FIG. 5 illustrates that with a BT peripheral(s) connected to the device under test (DUT), e.g., the portable device, while disposed in a clamshell mode physical configuration, the WLAN performance does suffer when utilizing coexistence schemes as discussed previously, especially in WLAN transmit mode. The left-hand columns in each pair of illustrated columns in FIG. 5 are indicative of a condition in which the coexistence scheme is not being utilized. The right-hand columns in each pair of illustrated columns are indicative of a condition, in which the coexistence scheme is being utilized, with the throughput of the lower priority WLAN data packets being reduced substantially. It should be noted, however, that such a reduction in WLAN throughput will generally be less noticeable to a user than a significant degradation in BT peripheral performance. Moreover, as noted above, the WLAN transmit mode is asymmetrically impacted, so WLAN receive operations/throughput will suffer even less.

Figure 6:
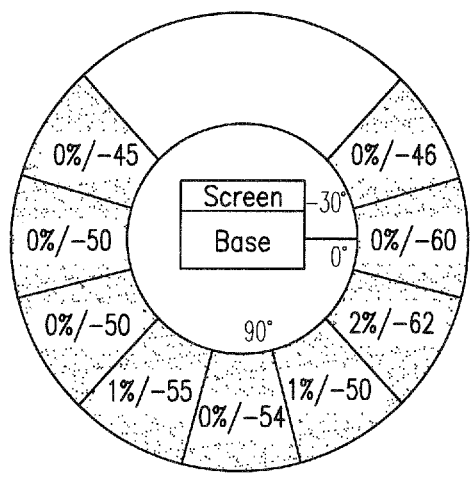
FIG. 6 is a graphical illustration of the packet error rate (PER) observed for a typical Bluetooth mouse as a function of position and WLAN transmission rate, with the coexistence compensation scheme not present or turned off (the portable device operating in an open-lid physical configuration).

FIG. 6 illustrates that in the open lid mode, the BT peripheral(s) PER is acceptable even with the coexistence scheme turned off. This is primarily because the WLAN/BT antenna isolation remains reasonable, even during simultaneous operation of the air interfaces. Furthermore, because the WLAN air interface and the BT air interface are operating in a truly simultaneous manner, the WLAN transmit/receive performance does not experience a significant decline in performance even while connected with BT peripheral(s), as shown in FIG. 7.

Figure 7:
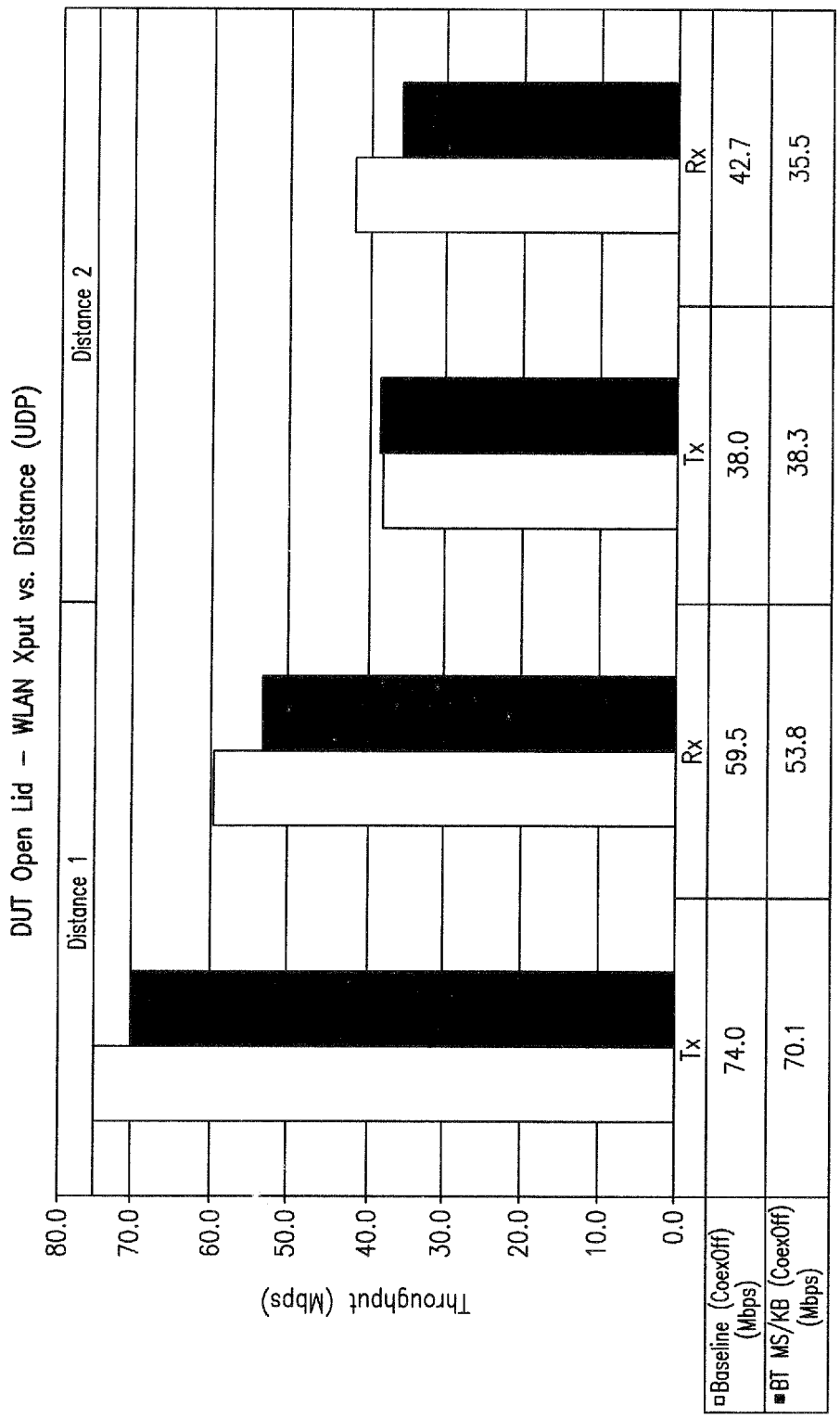
FIG. 7 is a graphical illustration of WLAN performance as a function of coexistence operation mode in an open-lid physical configuration.

FIG. 7 illustrates the WLAN throughput under multiple scenarios. The left-hand column of each of the illustrated pair of columns in FIG. 7 illustrates the transmit and receive throughput of the WLAN air interface at two different distances, with the coexistence scheme of the invention turned off, and without BT peripheral(s) connected to the device. The right-hand column of each of the illustrated pair of columns illustrates the same scenario as the left hand column, except with the BT peripheral(s) connected to the portable device. As can be seen, there is not a significant degradation in WLAN throughput when the portable device (i.e. DUT) is operating in an open-lid physical configuration.

System Establishment Procedures

Figure 8:
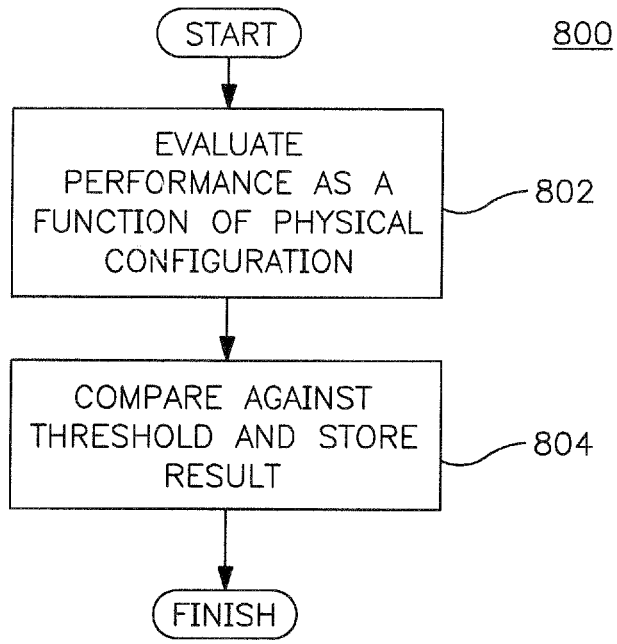
FIG. 8 is a process flow diagram illustrating an exemplary embodiment of the generalized method for establishing dynamic compensation of interference in a repeatable coexistence system.
Figure 9:
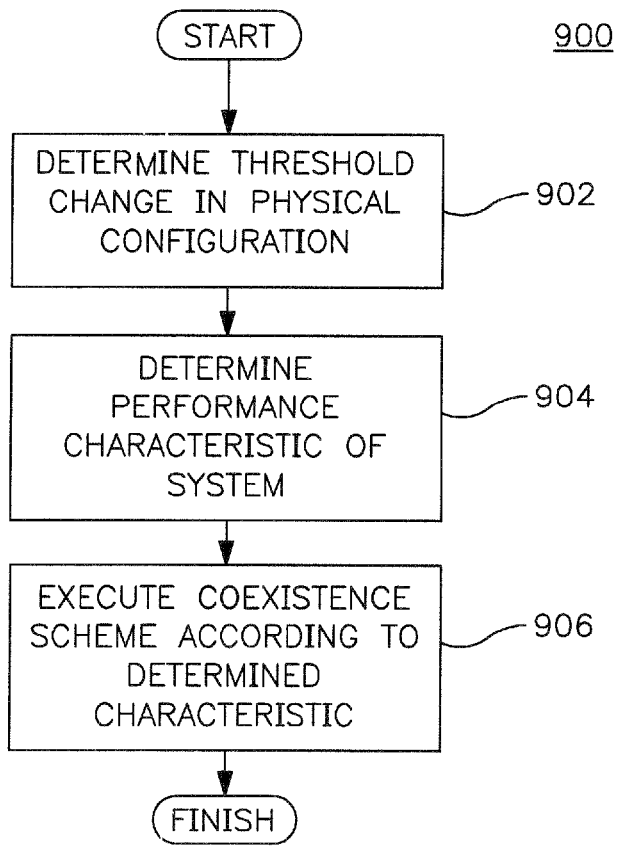
FIG. 9 is a process flow diagram illustrating an exemplary embodiment of the generalized method for establishing dynamic compensation of interference in a non-repeatable coexistence system.

While FIG. 1 previously described herein discusses the methodology of dynamic compensation as experienced by the user, FIGS. 8 and 9 illustrate exemplary embodiments of how the dynamic operation of FIG. 1 is established. It is recognized that the methodology described subsequently herein can be implemented in such a fashion as to be: (1) device- or system-specific; or (2) essentially platform agnostic. In device-/system-specific implementations, the generalized method of establishing a system that dynamically compensates for the effects of interference between multiple air interfaces based on physical configuration is performed at least once on an individual device, or on an individual class of devices (such as e.g., the MacBook™ laptop computers manufactured by the Assignee hereof). Alternatively, the methodology described subsequently herein can be adapted so as to be essentially platform-agnostic, with sole knowledge about physical configuration (and simultaneous operation of two or more air interfaces) of the device being enough to mitigate the effects of interference which would degrade user experience on the device across a wide number of platforms.

The following methodologies take these broad implementation examples into consideration. Specifically, the methodology of FIG. 8 is described in terms of a system that is expected to behave in a repeatable and predictable fashion as a function of physical configuration, or in which the bounds and ramifications of physical configuration changes are known and well understood. Such a scenario is particularly useful in device- or system-specific implementations. However, it is recognized that the methodology of FIG. 8 is not limited only to such device- or system-specific implementations.

FIG. 9, on the other hand, describes an exemplary methodology that can be performed on a periodic or anecdotal basis to determine how best to apply the co-existence schemes described herein. That is, in one exemplary embodiment, the system can utilize knowledge about a change in physical configuration as a trigger to evaluate one or more physical criteria relating to the air interface(s) to see whether or not co-existence remedial measure need to be taken in order to mitigate or eliminate harmful interference between air interfaces. Such an implementation is particularly useful in platform agnostic solutions, although it is recognized that such as system could be utilized in device- or system-specific implementations as well.

Referring again to FIG. 8, one exemplary embodiment of the generalized method of establishing a system that dynamically compensates for the effects of interference between multiple air interfaces based on physical configuration in a static (i.e., repeatable) system is disclosed. As shown in FIG. 8, the first step 802 of the method 800 comprises evaluating one or more physical criteria relating to the air interfaces as a function of physical configuration (e.g. (1) open; or (2) closed for a clamshell-type housing). In one embodiment, this criterion comprises antenna isolation (in decibels, or dB) as a function of physical configuration, although other/additional criteria may be evaluated as well, such as without limitation one or more of: (i) transmitter power (e.g., for one or multiple modules), (ii) receiver sensitivity, (iii) dynamic range, (iv) duty cycle, (v) the use of adaptive frequency hopping (AFH) or not, (vi) RSSI, and so forth.

Next, per step 804, the measured criterion (or criteria) are compared to a predetermined threshold value (or respective values for each of the multiple criteria where used). This comparison may be purely numeric in nature; e.g., measured value 'A' is greater than, less than, or equal to its relevant threshold. This can be accomplished for example using a simple algorithm. Alternatively, the variables or values may be evaluated by a human to identify any additional artifacts or information. For instance, a series of measurements of isolation between two antennas under varying external/environmental conditions may yield more information that just a direct "greater than/equal to/less than" type comparison, since the changes in the measured isolation values might correlate to one or more external/environmental variables. Visual inspection of plots of the data may also be useful in divining certain features or relationships. The variables used may also be fuzzy in nature (e.g., "high", "medium", "low" or the like). Various different approaches to assessing the relationship between one or more measured values and their relevant acceptance/decision criteria will be recognized by those of ordinary skill given the present disclosure, and accordingly are not described further herein. The results are then stored for later retrieval by the system implementing the interference mitigation techniques described previously herein with respect to FIG. 1.

Referring now to FIG. 9, one exemplary embodiment of the generalized method of establishing a system that dynamically compensates for the effects of interference between multiple air interfaces based on physical configuration in a dynamic (i.e., non-repeatable or unbounded use-case) system is disclosed. In one embodiment, the methodology is described in the context of a dynamic system which has a proximately located Bluetooth and WLAN radios. Such a dynamic system may comprise e.g., a laptop computer which implements both a Bluetooth and WLAN module within the laptop itself. In this embodiment, the Bluetooth and WLAN modules and/or antenna(s) associated therewith have a variable geometry; e.g., the Bluetooth module and/or antenna may be situated in the movable monitor/display portion of the device, while the WLAN module may be implemented in the base of the laptop, etc. Hence, depending on the relative positioning of the modules (i.e., due to the relative positioning of the monitor with respect to the base on the laptop), a range different isolation values may be obtained for the system. As is well known, existing implementations of Bluetooth and WLAN (i.e., 802.11 b/g/n) operate in the 2.4-2.4835 GHz frequency range. The aforementioned range of different values may also be affected by other conditions, such as the "noise floor" of the ambient environment (which can be affected by e.g., the presence/operation of nearby equipment such as external radios, the use of a Wi-Fi "card" or other removable form factor versus an indigenous radio, etc.).

As a threshold matter, at step 902, the system determines whether there has been a substantive or salient change in physical configuration of the device which would warrant further evaluation. For example, in binary systems (i.e., those systems only concerned with being open or closed), the threshold change evaluated is based on whether the device changes from one state (e.g., open) to another state (e.g. closed). Alternatively, this threshold change might be implemented after a change in physical configuration of more than ten degrees (10°), etc.

At step 904, the performance characteristic of the system is determined and evaluated upon determining the threshold change in physical configuration. In one exemplary embodiment, this comprises evaluating the antenna isolation between the co-located air interfaces. The antenna isolation in the system is measured in order to better understand the level of severity of communication interference. Although it is recognized that other performance characteristics (such as those described above with respect to FIG. 8) could also be taken into consideration, whether alone or in conjunction with the isolation measurement, in order to evaluate the performance of the system.

At step 906, the system executes (or alternatively does not execute) a coexistence scheme according to the characteristic determined at step 904. In another variant, the system at step 906 determines which of a plurality of different co-existence schemes to implement (which can, as previously discussed, be tailored to individual types of conditions or operating environments which may reasonably be encountered), or which can be based on the severity of interference encountered. Similar to previous methodologies described herein, the present methodology mitigates or compensates for the effects of interference by operating according to a set of rules which are based on a certain operating criteria of the system. In the illustrated embodiment, the relevant operating criterion comprises the antenna isolation between the physically proximate WLAN and Bluetooth implementations, and the executed coexistence scheme comprises implementing a time-sharing algorithm between the co-located air interfaces in order to mitigate interference. However, it is recognized that other criteria and/or schemes can be used. For instance, isolation and RSSI might be considered as criteria, and the scheme implemented might also involve changing operating modes of one or both of the BT or WLAN interfaces (e.g., transmit power, use of AFH, MIMO versus SISO on WLAN antenna(s) etc.). In one such variant, an enhanced or modified AFH approach may also be used, such as that described in co-owned and co-pending U.S. patent application Ser. No. 12/573,755 filed Oct. 5, 2009 and entitled "Methods and Apparatus for Enhanced Coexistence Algorithms In Wireless Systems", previously incorporated herein. Specifically, information (including for example the Receiver Signal Strength Index (RSSI) at the receiver for one of the multiple air interfaces of the device) can be used to determine whether or not a modified spread-spectrum mapping should be executed. For example, in the context of an exemplary co-located WLAN and BT air interface, the existing adaptive frequency hopping (AFH) algorithm of Bluetooth is modified and optimized under the present invention so as to provide enhanced user experience over that which would otherwise be achievable in the aforementioned WLAN/BT use cases using traditional AFH. The enhanced AFH algorithm of the invention effectively lowers the isolation requirement needed between the interfaces on the computing device by implementing one or more "intelligent" management functions (e.g., avoiding certain frequency bands in proximity to the transmitter). In addition, the system noise floor may also advantageously be measured and taken into account when providing for additional levels interference mitigation. For example, if the system noise floor exceeds a prescribed or dynamically determined threshold value, then additional measures such as the reduction of transmit power on one or more of the air interfaces can be implemented, such as via the transmission of control signals to one or more of the air interfaces.

In another such variant, the module power saving mode may also be taken into account. See for example the methods and apparatus described in co-owned and co-pending U.S. Patent Publication No. 20090257379 to Robinson, et al. published Oct. 15, 2009 and entitled "Methods and apparatus for network capacity enhancement for wireless device coexistence", which is incorporated herein by reference in its entirety. For instance, the device can be made to operate in a power-saving mode at all times (irrespective of whether the device is utilizing battery power, DC power supplied from an AC wall or inductive converter, or both), such that the WLAN interface must in effect be "woken up" whenever a data transmission/reception of significance is required. This way, the WLAN's use of the conflicting frequency spectrum (e.g., 2.4 GHz) is minimized in favor of use of that same spectrum by the client's BT device(s) such as wireless headset, mouse, keyboard, etc.

In another variant, the foregoing interference mitigation scheme is further enhanced by management of various operational modes for the BT interface, in effect throttling the BT interface's use of the spectrum when such use would negatively impact WLAN duty cycle by the device, or other WLAN users in proximity (e.g., on the same AP). This management scheme can be made dependent upon one or more operational criteria, such as for example the level of network traffic, number of user, and so forth. Depending on these operational criteria, differing operating rules are implemented so as to achieve the goal of providing the users of the network with the best overall user experience possible, and having their devices act as "good neighbors" to other local devices by minimizing interference within the common spectrum.

Apparatus—

Figure 10:
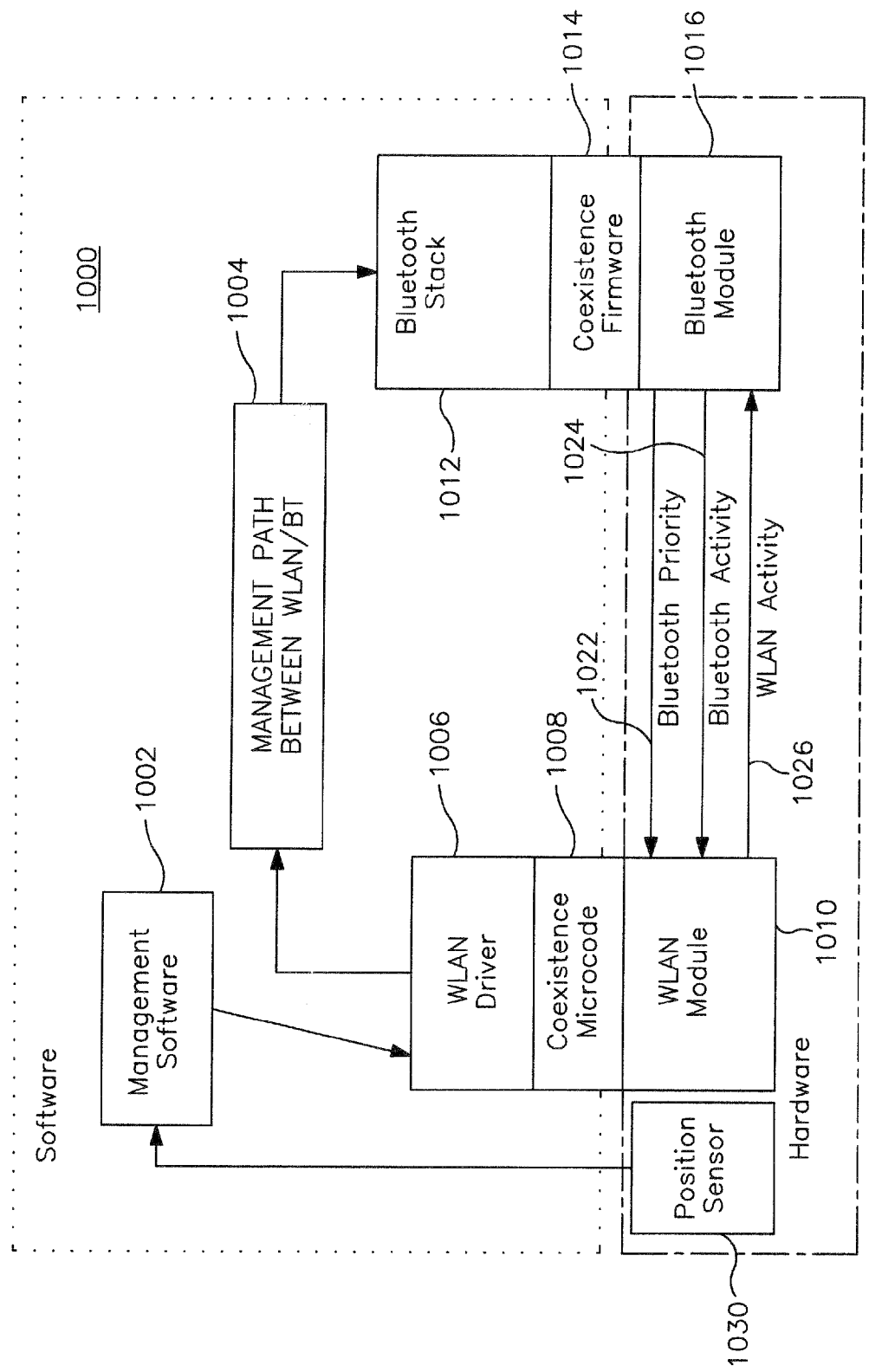
FIG. 10 is a functional block diagram illustrating an exemplary WLAN/Bluetooth enabled apparatus utilizing interference mitigation.

Referring now to FIG. 10, an exemplary apparatus 1000 implementing coexistence features previously described herein is shown and described in detail. It will be appreciated that while described in the exemplary context of BT and WLAN interfaces, the apparatus 1000 of FIG. 10 is in no way so limited.

The apparatus 1000 of FIG. 10 will generally be implemented within a single client device (e.g., laptop computer, smartphone, etc.) such that the WLAN module 1010 and the Bluetooth module 1016 are substantially co-located with one another, thereby introducing some level of RF interference as a result of less-than-optimal antenna isolation. However, it will be recognized that the different modules may also reside in different physical devices which themselves are proximate to one another, as previously described.

The apparatus 1000 shown in FIG. 10 comprises combined software 1020 and hardware 1030 elements which together compensate for the interference caused by having both the air interfaces (e.g., WLAN module 1010 and Bluetooth module 1016) operating in close spatial proximity to one another. The software portion 1020 of the apparatus 1000 comprises management software 1002, a WLAN driver 1006, and coexistence microcode 1008 for WLAN, as well as a Bluetooth stack 1012, and coexistence firmware 1014 for Bluetooth. A management path 1004 between the software portions of the WLAN and Bluetooth portions of the system 1000 is also optionally provided. In one variant, the aforementioned management path 1004 comprises a software interface (e.g., API) of the type well known in the software arts, although other approaches may be sued as well.

The WLAN management software 1002 can handle a plurality of WLAN management functions such as, e.g. implementing a power saving mode (PSM) for the WLAN module 1010 of the type described in co-owned and co-pending U.S. patent application Ser. No. 12/006,992 filed Jan. 7, 2008 and entitled "Methods and Apparatus for Wireless Device Coexistence", the contents of which are incorporated herein by reference in its entirety. The WLAN driver 1006 is in communication with WLAN management software 1002. As is well known, the WLAN driver 1006 acts as a communication interface between higher level computer processes (such as the WLAN management software 1002) with the WLAN hardware. The WLAN module 1010 itself acts as the physical hardware necessary to implement the WLAN functionality.

On the Bluetooth side of the illustrated apparatus, the Bluetooth software stack 1012 comprises an implementation of the Bluetooth protocol (see, e.g., Bluetooth Core Specification v2.1+EDR dated Jul. 26, 2007 {Bluetooth SIG}, incorporated herein by reference in its entirety) allowing flexible implementation of a plurality of different Bluetooth profiles. These profiles can include for example software for a Bluetooth enabled headset, or for a Bluetooth enabled I/O device such as a keyboard or mouse; see, e.g., Bluetooth Advanced Audio Distribution Profile 1.2 dated 16 Apr. 2007; Bluetooth Audio/Video Remote Control Profile 1.3 16 Apr. 2007; Bluetooth Basic Imaging Profile (BIP) 25 Jul. 2003; Bluetooth Basic Printing Profile (BPP) 1.2 27 Apr. 2006; Bluetooth Common ISDN Access Profile (CIP) 16 Nov. 2002; Bluetooth Cordless Telephony Profile (CTP) 22 Feb. 2001; and Bluetooth Device Identification Profile (DI) 1.3 26 Jul. 2007, each of the foregoing incorporated herein by reference in its entirety).

The Bluetooth stack 1012 is further in communication with coexistence firmware 1014 which is communicates with the Bluetooth module 1016. The Bluetooth module 1016 further comprises the Bluetooth radio hardware.

Another feature of the apparatus 1000 of FIG. 10 is the software communications management path 1004 between WLAN and Bluetooth. This is significant in that it permits the implementation of a closed-loop solution between the WLAN module 1010 and the Bluetooth module 1016, in one embodiment as described in U.S. patent application Ser. No. 12/006,992 previously incorporated by reference herein. In the illustrated embodiment, this management path 1004 permits the Bluetooth module to read the WLAN channel, as well as permit management software to send an AFH command to the Bluetooth module 1016. While the present embodiment illustrates a one-way communications path between WLAN and Bluetooth, it is further envisioned that in some embodiments it may be desirable to have this software communications path 1004 be bi-directional.

Moreover, other types of management inputs are envisioned, including for example inputs as to the status of other modules or processes within the host device. In terms of a hardware communications path between the WLAN module 1010 and the Bluetooth module 1016, various approaches such as those described in previously mentioned U.S. patent application Ser. No. 12/006,992 could be utilized.

The position sensor 1030 is used to determine the physical configuration of the device as previously described above. In the embodiment illustrated, the position sensor is operatively coupled to the management software 1002 so that the management software makes decisions about the implementation of coexistence schemes depending on the physical configuration of the device. In another embodiment, an accelerometer of the type well known in the art is placed within the housing (e.g., the lid of a clamshell type housing previously described) and used as the basis of position sensing.

However, as previously noted, so-called "passive" techniques for determining configuration may be used as well, such as the detection of certain ancillary components being operated/enabled or not, certain types of applications or processes being used, and so forth.

It is also recognized that the apparatus 1000 of FIG. 10 can include a user interface (e.g., GUI, menu structure, icons, etc.), such as in the form of a "console", whereby users or technicians can control various of the parameters described above, in effect allowing for personalization and fine-tuning of the co-existence algorithm if desired. For instance, in one such variant, the console shows the various factory isolation/RF performance data (whether for that specific device, or class of devices), and the extant settings for the algorithm (e.g., thresholds, PER basis for various devices, etc. The user/technician may be given the ability to enter new values for certain parameters, thereby allowing them to optimize for their particular environment/use cases.

For example, in the case of a multi-state or analog position sensor, the factory setting might phase out the co-existence algorithm from operation when the monitor (lid) reaches 45-degrees from closed. However, the user may desire to keep co-existence in force until 65-degrees is reached.

As another example, the factory setting might implement co-existence for both transmit and receive operations of the WLAN (along with BT device use), while the user might prefer co-existence only on WLAN receive operations, due e.g., to the asymmetry referenced above (i.e., they don't want transmit data rate impacted, even at the expense of some mouse or keyboard "choppiness").

As yet another option, the user may be given the opportunity to vary the BT AFH size map so as to achieve the desired attributes.

Business Methods—

In another aspect of the invention, methods of doing business relating to the aforementioned apparatus and operational methods are disclosed.

Figure 11:
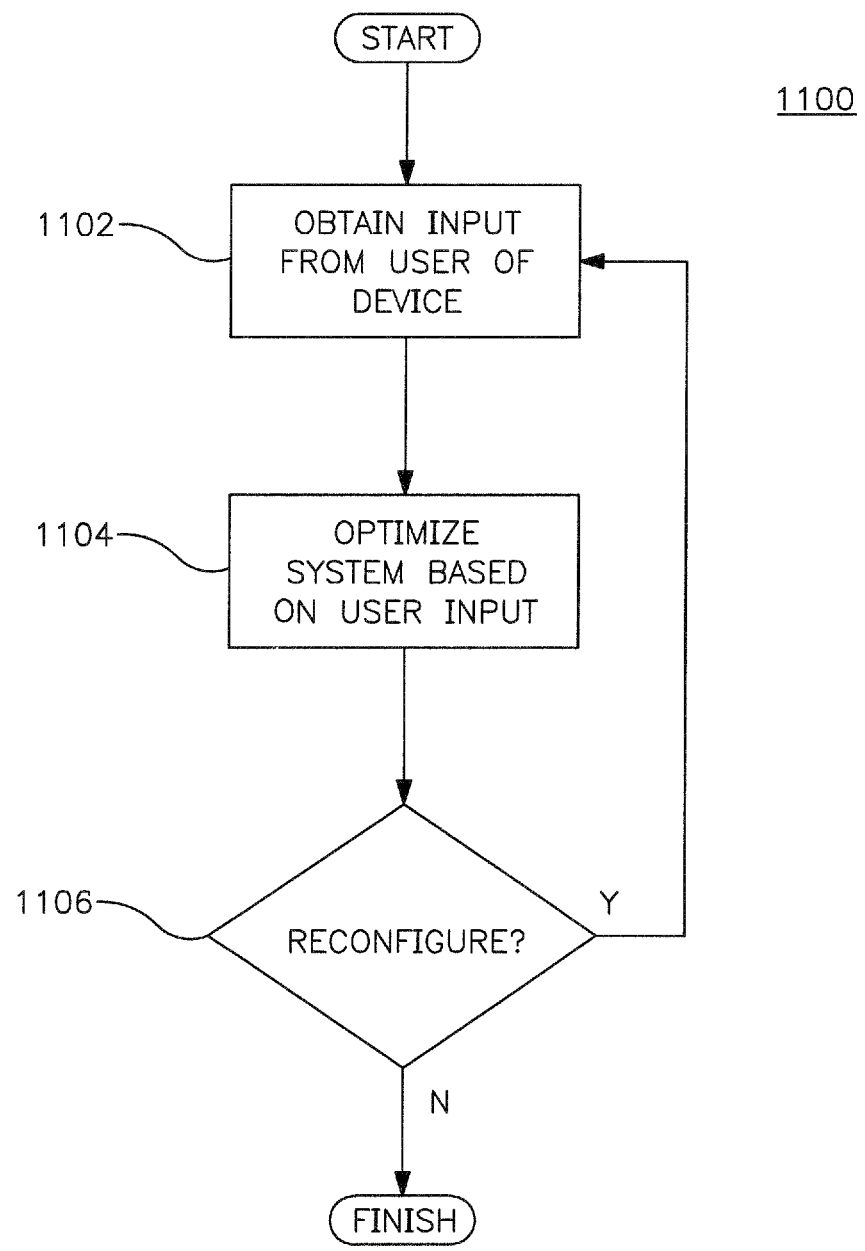
FIG. 11 is a logical flow diagram illustrating an exemplary embodiment of the generalized method for doing business in accordance with the principles of the present invention.

In one embodiment, the method comprises providing (e.g., selling for consideration) portable computers such as laptops, PDAs, smartphones, personal media devices, or other client devices or services (e.g., the Apple TV™ set-top box and service provided by the Assignee hereof) that have been optimized based on their measured radio frequency interface characteristics; e.g., antenna isolation. Specifically, as shown in FIG. 11, the client device configuration is determined per step 1102, including selection of various options by a consumer. This may be accomplished for example via the Internet (e.g., using an on-line configuration interface or "wizard" which allows the customer to configure their prospective device according to any number of different options). The configured device is optimized according to, for example, the methodology of FIGS. 8-9 based on its measured antenna isolation, and/or optionally any other parameters of interest as previously described herein. For "static" devices of the type previously described, this optimization can be accomplished per step 1104 on: (i) a prototype basis, such as where a prototype device representative of the production run in that particular configuration is tested and optimized based on the actual measured antenna isolation values; and/or (ii) a per-unit or statistical sampling basis, such as where every production unit (or a statistically significant sampling thereof) is evaluated and optimized. For instance, some devices may use a metallic casing or housing and closely proximate antenna for the various air interfaces, whereas other devices may have a plastic casing with more physically disparate antenna locations.

In another variant, the particular type of environment in which the device will be predominantly used can be supplied by the requesting consumer, thereby allowing at least some degree of device-specific or customized evaluation and optimization. For instance, if the predominant use of the device will be in an open-air environment where multi-path interference, Rayleigh fading, or other such physical phenomena are not as significant, then the optimization applied may conceivably be different than that applied where the same unit was intended to be predominantly used in a high multi-path/high fade environment. Hence, the present invention contemplates in general the "tuning" of a particular device configuration for use in a particular environment.

At step 1106, it is determined whether the user wishes to reconfigure their device. In one embodiment, consumers may bring back their already purchased client devices (e.g., laptops, smartphones, etc.) for or after reconfiguration so as to have them "re-optimized" for the new configuration. Alternatively, the user's device may be configured with its own indigenous evaluation/optimization capability as previously described. For example, a laptop user might install a Wi-Fi card (or an upgraded version thereof) themselves if their production device was not so equipped. With the new card, there may be significant interference with another existing or co-installed air interface such as Bluetooth, hence requiring optimization according to the methods described herein. The computer manufacturer, the user themselves, or a third party distributor/repair facility, could then measure the antenna isolation, and adjust the computer (e.g., program the indigenous algorithm already resident on the computer previously described, or add the algorithm if not there and configure appropriately) to optimize operation of the interfaces (and the device as a whole) so as to optimize the desired attributes, such as mitigation of interference.

Alternatively, it will be recognized that the client device and algorithm may be configured to perform this step automatically; e.g., by sensing the presence or addition of new hardware (e.g., Wi-Fi card), and then conducting an antenna isolation or other parametric evaluation (or prompting the user to do so, such as via a third party) as described in, for example, co-owned and co-pending U.S. patent application Ser. No. 12/215,574 filed Jun. 26, 2008 and entitled "Methods And Apparatus For Antenna Isolation-Dependent Coexistence In Wireless Systems", the contents of which are incorporated herein by reference in its entirety. Once the isolation data is obtained, whether manually or automatically, the optimization algorithm can use this data to select the best operational policy or policies for that particular configuration.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of mitigating the interference between multiple wireless communication apparatus disposed substantially within a clamshell device, the method comprising:
   determining a physical configuration of two or more components of the device comprising (i) an open-lid mode and (ii) a closed-lid mode;
   operating the device according to a co-existence scheme based at least in part on the determined physical configuration; and
   based at least in part on the determined physical configuration, turning at least a portion of the co-existence scheme on or off.

2. The method of claim 1, additionally comprising determining if multiple air interfaces are operating simultaneously.

3. The method of claim 2, wherein the multiple air interfaces include at least a Bluetooth interface, and a Wireless Local Area Network (LAN) interface.

4. The method of claim 1, additionally comprising storing a parameter value representing the determined physical configuration to an application programming interface (API) registry.

5. The method of claim 1, wherein the physical configuration further comprises a granular scale.

6. The method of claim 5, wherein the granular scale comprises a range of degrees.

7. The method of claim 5, wherein the granular scale comprises a range of percentages.

8. The method of claim 1, wherein the act of determining the physical configuration comprises sensing the physical configuration of the device via one or more sensing apparatus.

9. The method of claim 1, wherein the act of determining the physical configuration comprises monitoring the status of an extant state indicator.

10. The method of claim 1, wherein the act of determining the physical configuration comprises sensing one or more radio interference parameters.

11. The method of claim 10, wherein the one or more radio interference parameters is selected from the group consisting of: (i) transmitter power, (ii) receiver sensitivity, (iii) dynamic range, (iv) duty cycle, (v) the use of adaptive frequency hopping (AFH), and (vi) received signal strength indication (RSSI).

12. The method of claim 1, wherein said co-existence scheme comprises adjusting one or more priorities corresponding to a plurality of air interfaces.

13. The method of claim 1, wherein said co-existence scheme comprises adjusting one or more duty cycles corresponding to a plurality of air interfaces.

14. The method of claim 1, wherein said co-existence scheme comprises adjusting one or more data rates corresponding to one or more air interfaces.

15. An apparatus configured to perform wireless operation in a plurality of physical configurations, wherein the apparatus comprises:
   a clamshell form factor;
   one or more wireless interfaces;
   a sensor configured to detect a position of at least one of the one or more wireless interfaces relative to a reference;
   a digital processor; and
   a storage apparatus having a storage medium with at least one computer program stored thereon, the at least one computer program comprising a plurality of computer executable instructions that when executed by the digital processor:
      based on the detected position of the sensor, determine a current configuration from the plurality of physical configurations of the apparatus, the current configuration comprising one of (i) an open-lid mode, and (ii) a closed-lid mode; and
      configure the one or more wireless interfaces based at least in part on the determined current configuration;
      wherein at least one of the one or more wireless interfaces turns on or off at least a portion of a co-existence scheme, based at least in part on the determined current configuration.

16. The apparatus of claim 15, wherein the one or more wireless interfaces comprises at least a first and a second wireless interface, the first and second wireless interfaces capable of simultaneous operation.

17. The apparatus of claim 15, wherein the first interface comprises a Bluetooth interface, and the second interface comprises a Wireless Local Area Network (LAN) interface.

18. The apparatus of claim 15, wherein the apparatus further comprises: at least a first housing portion and a second housing portion, the first and second portions joined with a hinge element.

19. The apparatus of claim 18, wherein the hinge element has a granular scale spanning a range of degrees.

20. The apparatus of claim 15, further comprising a sensing apparatus configured to detect one or more radio interference parameters.

21. The apparatus of claim 20, wherein the one or more radio interference parameters is selected from the group consisting of: (i) transmitter power, (ii) receiver sensitivity, and (iii) dynamic range.

22. The apparatus of claim 20, wherein the one or more radio interference parameters is selected from the group consisting of: (i) duty cycle, (ii) the use of adaptive frequency hopping (AFH), and (iii) received signal strength indication (RSSI).

23. The apparatus of claim 15, wherein at least one of the one or more wireless interfaces prioritizes one or more operations, based at least in part on the determined current configuration.

24. The apparatus of claim 15, wherein at least one of the one or more wireless interfaces adjusts one or more duty cycles, based at least in part on the determined current configuration.

25. The apparatus of claim 15, wherein at least one of the one or more wireless interfaces adjusts one or more data rates, based at least in part on the determined current configuration.

26. A method of mitigating the interference between multiple wireless communication apparatus disposed substantially within a clamshell device, the method comprising:
    determining a physical configuration of the device, the physical configuration comprising one of (i) an open-lid mode, and (ii) a closed-lid mode; and
    operating the device according to a co-existence scheme, the co-existence scheme comprising adjusting one or more priorities corresponding to a plurality of air interfaces, based at least in part on the determined physical configuration.

27. The method of claim 26, additionally comprising determining that multiple air interfaces of the plurality of air interfaces are operating simultaneously.

28. The method of claim 27, wherein the plurality of air interfaces include at least a Bluetooth interface, and a Wireless Local Area Network (LAN) interface.

29. The method of claim 26, additionally comprising storing a parameter value representing the determined physical configuration to an application programming interface (API) registry.

30. The method of claim 26, wherein the physical configuration further comprises a granular scale.

31. The method of claim 30, wherein the granular scale comprises a range of degrees.

32. The method of claim 30, wherein the granular scale comprises a range of percentages.

33. The method of claim 26, wherein the act of determining the physical configuration comprises sensing the physical configuration of the device via one or more sensing apparatus.

34. The method of claim 26, wherein the act of determining the physical configuration comprises monitoring the status of an extant state indicator.

35. The method of claim 26, wherein the act of determining the physical configuration comprises sensing one or more radio interference parameters.

36. The method of claim 35, wherein the one or more radio interference parameters is selected from the group consisting of: (i) transmitter power, (ii) receiver sensitivity, (iii) dynamic range, (iv) duty cycle, (v) the use of adaptive frequency hopping (AFH), and (vi) received signal strength indication (RSSI).

37. The method of claim 26, wherein the co-existence scheme is turned at least partly on or off, based at least in part on the determined physical configuration.

38. The method of claim 26, wherein the co-existence scheme comprises adjusting one or more duty cycles corresponding to the plurality of air interfaces.

39. The method of claim 26, wherein the co-existence scheme comprises adjusting one or more data rates corresponding to at least one of the plurality of air interfaces.

* * * * *